(12) United States Patent
Luong et al.

(10) Patent No.: US 8,731,493 B2
(45) Date of Patent: May 20, 2014

(54) WIRELESS LOCAL AREA NETWORK TEST SYSTEM WITH FORCED TRANSMIT RATES DURING PROTOCOL-BASED TESTING

(75) Inventors: Anh Luong, Santa Clara, CA (US); Justin Gregg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 628 days.

(21) Appl. No.: 12/913,718

(22) Filed: Oct. 27, 2010

(65) Prior Publication Data
US 2011/0103235 A1    May 5, 2011

Related U.S. Application Data

(60) Provisional application No. 61/256,860, filed on Oct. 30, 2009.

(51) Int. Cl.
*H04B 17/00* (2006.01)

(52) U.S. Cl.
USPC ........................................................ 455/115.2

(58) Field of Classification Search
USPC ........... 370/241–245, 248, 252–253, 231–34; 455/115.1–115.3
See application file for complete search history.

(56) References Cited

U.S. PATENT DOCUMENTS

| | | | |
|---|---|---|---|
| 6,216,010 B1 | 4/2001 | Edwards et al. | |
| 7,085,592 B1 | 8/2006 | Davies | |
| 7,595,629 B2 * | 9/2009 | Miller | 324/750.02 |
| 7,672,669 B2 | 3/2010 | Alexander et al. | |
| 7,773,531 B2 | 8/2010 | Olgaard et al. | |
| 7,881,680 B1 * | 2/2011 | Viehweg et al. | 455/114.3 |
| 8,116,703 B2 * | 2/2012 | Sorensen | 455/115.1 |
| 2003/0142629 A1 | 7/2003 | Krishnamurthi et al. | |
| 2005/0137814 A1 * | 6/2005 | Kelly et al. | 702/69 |
| 2006/0012388 A1 * | 1/2006 | Lin et al. | 324/750 |
| 2006/0229018 A1 | 10/2006 | Mlinarsky et al. | |
| 2006/0274657 A1 | 12/2006 | Olgaard et al. | |
| 2007/0254643 A1 * | 11/2007 | Garcia et al. | 455/423 |
| 2007/0266289 A1 | 11/2007 | Yang | |
| 2008/0020746 A1 * | 1/2008 | Alexandar et al. | 455/423 |
| 2009/0175181 A1 | 7/2009 | Kim et al. | |
| 2010/0228515 A1 * | 9/2010 | Srinivasan et al. | 702/124 |
| 2010/0277839 A1 * | 11/2010 | Nicholson et al. | 361/54 |
| 2012/0113829 A1 * | 5/2012 | Olgaard et al. | 370/252 |
| 2012/0208484 A1 * | 8/2012 | Holzer | 455/341 |
| 2012/0231745 A1 * | 9/2012 | Gregg et al. | 455/67.12 |

OTHER PUBLICATIONS

"MT8860B WLAN Test Set," Product Brochure, Anritsu, Jul. 2007.
"IEEE 802.11" [online]. Wikipedia., [retrieved on Oct. 27, 2010]: <http://en.wikipedia.org/wiki/IEEE_802.11>.

* cited by examiner

*Primary Examiner* — Thai Hoang
(74) *Attorney, Agent, or Firm* — Treyz Law Group; G. Victor Treyz; Michael H. Lyons (57) ABSTRACT

A system for performing wireless local area network testing of wireless devices may include a wireless local area network tester and a device under test. The tester and device under test may communicate over a wireless link. To ensure that the tester accurately analyzes test data, a data rate table is used that specifies fixed data transmission rates to be used by the device under test under both high-quality link conditions and low-quality link conditions. This forces the device under test to transmit control packets at the same high data rate during packet loopback testing, regardless of link quality. When the captured control packets are analyzed at the tester, both low-link-quality data and high-link-quality data may be analyzed using a common test template, ensuring accurate results.

10 Claims, 5 Drawing Sheets

WIRELESS LOCAL AREA NETWORK TEST SYSTEM WITH FORCED TRANSMIT RATES DURING PROTOCOL-BASED TESTING

This application claims the benefit of provisional patent application No. 61/256,860, filed Oct. 30, 2009, which is hereby incorporated by reference herein in its entirety.

BACKGROUND

This invention relates to testing electronic devices, and more particularly, to wireless testing of electronic devices using testers.

Electronic devices such as cellular telephones, portable computers, and other devices often contain wireless circuitry. This wireless circuitry may be used, for example, to support wireless local area networking (WLAN) functionality. In a typical scenario, a wireless electronic device may support IEEE 802.11 wireless networking standards (sometimes referred to as WiFi®).

Wireless test equipment is used to test wireless electronic devices. For example, wireless test equipment is sometimes used to perform WLAN tests.

A tester may, for example, perform packet loopback testing. In packet loopback testing, control messages are transmitted from a tester to a device under test (DUT) in the form of a number of data packets. The control messages instruct the DUT to retransmit received data. The returned packets from the DUT are then captured by the tester. The tester analyzes the returned packets using its built-in analysis capabilities. Test analysis may be performed to extract radio-frequency parametric data such as transmit power and error vector magnitude.

The rate at which a DUT retransmits the received data typically varies as a function of link quality. As a result, the tester does not known in advance what data transmission rate will be used by the DUT. When analyzing returned packets from the DUT, the tester may therefore use an analysis model that is not appropriate for that transmission rate. This can lead to erroneous test results. For example, the values computed for the transmit power and error vector magnitude may be incorrect.

It would therefore be desirable to be able to provide improved techniques for wirelessly testing devices under test.

SUMMARY

A system for performing wireless local area network testing of wireless devices may include a wireless local area network tester and a device under test. The tester and device under test may communicate over a wireless link. Protocol-based testing such as packet loopback testing may be used to test the device.

During packet loopback testing, control packets are exchanged between the wireless local area network tester and the device under test. The quality of the wireless link may be high (e.g., sufficient to support communications at a high data rate such as 54 Mbps in normal operation) or may be low (e.g., only sufficient to support communications at a lower data rate such as 6 Mbps in normal operation). Even though the link quality varies significantly in this way, a data rate table may be used in the test system to force the device under test to transmit control packets at a high data rate (e.g., 54 Mbps) regardless of link quality.

In a typical packet loopback test, the wireless local area network tester transmits Internet Control Message Protocol (ICMP) pings to the device under test and the device under test responds by sending acknowledgement (ACK) codes to the tester. Because the device under test is forced to transmit data at a fixed high rate (e.g., 54 Mbps) regardless of link quality, the tester is assured that captured ACK data from the device under test was transmitted at a known high rate (e.g., 54 Mbps). When the test data is analyzed at the tester, the tester can apply the same test template (e.g., a 54 Mbps profile) to both high-link-quality ACK data and low-link-quality ACK data. This ensures that the radio-frequency parametric data that is extracted from the captured ACK data will be accurate.

Further features of the invention, its nature and various advantages will be more apparent from the accompanying drawings and the following detailed description of the preferred embodiments.

DETAILED DESCRIPTION

This relates to performing radio-frequency testing of electronic equipment.

The electronic equipment that is tested may include equipment such as cellular telephones, computers, computer monitors with built in wireless capabilities, desktop computers, handheld computers, portable computers, laptop computer, tablet computer, and other wireless electronic equipment. When equipment is being tested, the equipment is typically referred to as a device under test (DUT).

Test equipment may be used in performing wireless tests on a device under test. The test equipment may be based on a single test instrument. The test equipment may also be based on multiple pieces of test equipment and associated computers. For example, test systems may be used in which a tester is implemented using one or more networked computers, shared databases, racks of one or more pieces of test equipment, etc. For clarity, this equipment is typically referred to collectively herein as a "tester," regardless of whether one piece of equipment or more than one piece of test equipment is being used.

Figure 1:
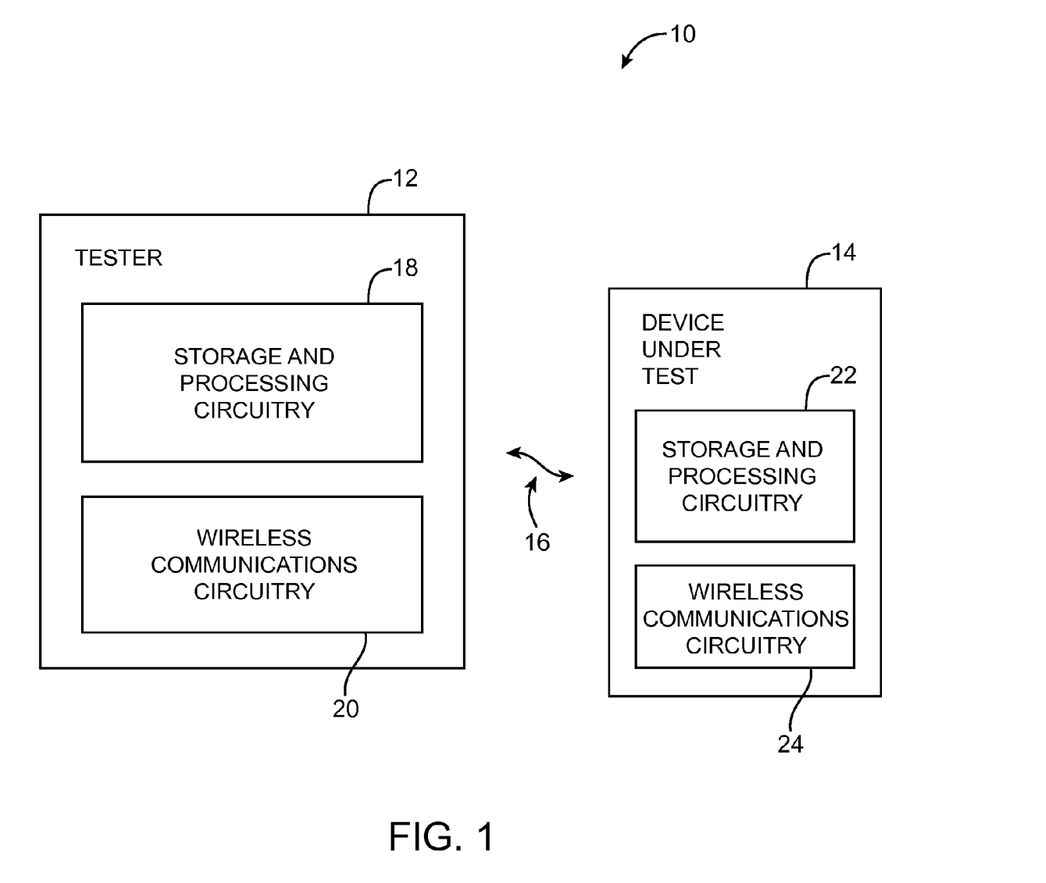
FIG. 1 is a diagram of a system that includes a device under test and an associated tester that may be used to perform wireless tests on the device under test in accordance with an embodiment of the present invention.

A test environment in which an electronic device may be tested is shown in FIG. 1. As shown in FIG. 1, test system 10 may include a device under test such as device under test (DUT) 14 and a wireless device tester such as wireless local area network tester 12. Device under test 14 may include storage and processing circuitry 22 and wireless communications circuitry 24. Wireless communications circuitry 24 may include one or more antennas and may be used to support wireless local area network links (e.g., IEEE 802.11 links). Wireless communications circuitry 24 may be used, for example, to support wireless area networks (WANs) such as wireless local area networks (WLAN) and personal local area networks (PLAN). DUT 14 may support IEEE 802.11a/b/g/n wireless networking standards (sometimes referred to as WiFi®). If desired, DUT 14 may also support wireless networking standards that can support data transfers at rates of up to 1 Gbps or more (e.g., IEEE 802.11ac and 802.16d/e wireless networking standards such as WiMAX), wireless networking standards that use a 60 GHz operating frequency (e.g., IEEE 802.11ad wireless networking standards such as WiGig), and other wireless networking standards.

Storage and processing circuitry 22 may include storage such as hard drive storage, random-access memory and other volatile memory, flash circuits, solid state disks, and other non-volatile memory, etc. Processing circuitry in storage and processing circuitry 22 may be based on one or more microprocessors, microcontrollers, digital signal processors, application-specific integrated circuits, etc.

Tester 12 may include storage and processing circuitry 18 and wireless communications circuitry 20. Circuitry 20 may include one or more antennas and may be used to support wireless communications with wireless communications circuitry 24 of device under test 14. For example, circuitry 20 and circuitry 24 may communicate over a wireless link such as wireless path 16 of FIG. 1.

Storage and processing circuitry 22 may include volatile and non-volatile memory, hard drives, and other storage media. Processing circuitry in storage and processing circuitry 18 may include microprocessors, microcontrollers, digital signal processors, application-specific integrated circuits, etc. Test personnel may interact with tester 12 using any suitable user input-output interface. For example, circuitry 18 may include input devices such as keyboards, mice, trackpads, and buttons. Circuitry 18 may also include output devices such as computer monitors, printers, and speakers. Test settings may be supplied to tester 18 using the input capabilities of tester 12. Test results may be displayed on a monitor, stored in a database in storage and processing circuitry 18, or transmitted to remote computing equipment (e.g., over the Internet or other network).

When evaluating the performance of electronic devices, it is sometimes desirable to perform protocol-based tests. During protocol-based tests, a tester and device under test communicate using the communications protocols that the device is expected to use during normal operation.

In the illustrative arrangement of FIG. 1, device under test 14 support wireless local area networking protocols such as IEEE 802.11 protocols, so tester 12 preferably performs protocol-based tests for analyzing the performance of device 14 when communicating using IEEE 802.11 protocols. Tester 12 may be implemented using a stand-alone test instrument or, if desired, multiple pieces of equipment (e.g., spectrum analyzer equipment, power meter equipment, signal generators, transceivers, etc.) may be interconnected to form tester 12. An advantage of implementing tester 12 using a single test instrument is that this eliminates the need for complex equipment programming operations and other overhead tasks that might be associated with setting up and running a more complex test system.

Tester 12 can be used to perform a variety of transmitter and receiver measurements. For example, tester 12 may simulate the functions of a wireless access point to measure the sensitivity of receiver circuitry in device under test 14. Tester 12 may also make test measurements on transmitter parameters associated with device under test 14. Examples of transmitter measurements that may be made include measurements on transmitted radio-frequency signal spectrums, error vector magnitude (EVM), transmit power, etc. If desired, multiple measurements may be made in parallel using tester 12, thereby enhancing test throughput.

Tester 12 may be used to perform packet loopback tests. In packet loopback tests, tester 12 can use wireless local area network protocols such as IEEE 802.11 protocols to establish a wireless communications path such as wireless link 16 with device under test 14. Control packets may then be transmitted from tester 12 to device 14 over link 16. Device 14 may respond by transmitting packets to tester 12 over link 16.

Figure 2:
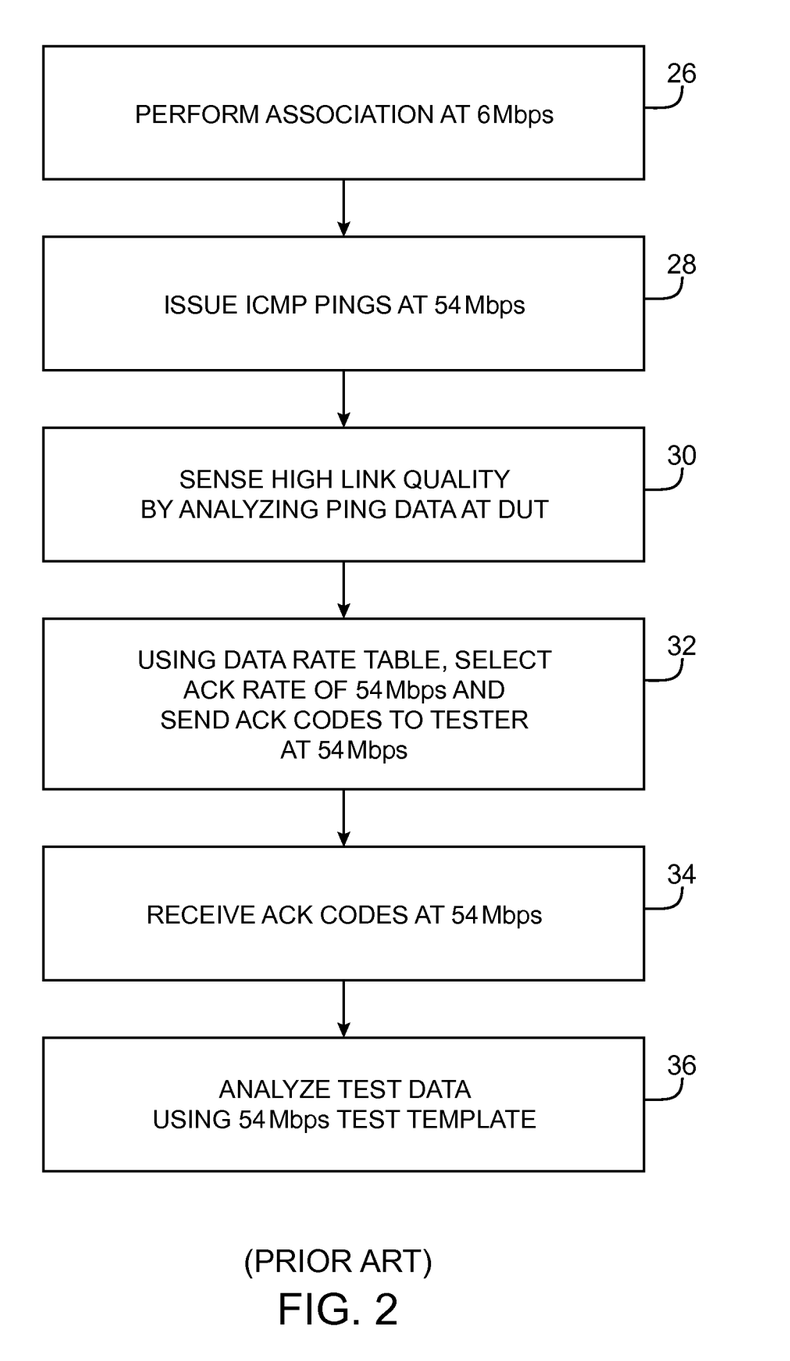
FIG. 2 is a flow chart of steps involved in conventional wireless device testing in a situation in which the wireless link between a tester and a device under test exhibits a high quality.

Steps involved in conventional loopback testing using an IEEE 802.11 protocol such as the IEEE 802.11(a) protocol are shown in FIG. 2.

As shown in FIG. 2, an association process may be implemented at step 26. Using the association process, the wireless device under test associates with the tester. During the association process, the tester and device exchange control packets at a default data rate of 6 Mbps.

Once the device under test has associated with the tester, operation proceeds to step 28. During step 28, the tester issues Internet Control Message Protocol (ICMP) ping commands at a data rate of 54 Mbps.

At step 30, the device under test receives and analyzes the ICMP pings and evaluates the quality of the wireless link with the tester using a data rate table (step 30). The data rate table specifies which data rates are to be used in wireless transmissions as a function of link quality. In the example of FIG. 2, the link quality is high, so, in conformity with the entries in the data rate table, the device under test sends the ACK codes to the tester at a high data rate of 54 Mbps during step 32.

At step 34, the tester receives and captures the ACK codes.

The captured ACK code data can be analyzed at step 36. During the analysis operations of step 36, the tester extracts desired radio-frequency parameters from the raw data that has been captured. For example, tester can extract radio-frequency parametric measurement values such as transmit power and error vector magnitude.

During the data analysis operations of step 36, the tester uses a model (sometimes referred to as a test template or profile) that is tailored to the 54 Mbps data rate. This typically results in accurate computations of test data values. For example, if the actual transmit power of the device under test is −15 dBm, the analysis operations of step 36 will, by applying the 54 Mbps test template to the captured 54 Mbps ACK data, generally be able to produce an accurate extracted transmit power value of −15 dBm.

However, significant inaccuracies arise with conventional techniques of the type shown in FIG. 2 when the link quality is not high. This may occur, for example, when the wireless communications path between the tester and the device under test is intentionally impaired as part of a rigorous test.

In this situation, extracted radio-frequency parametric measurement values may be erroneous. Consider, as an example, the scenario of FIG. 3. In the FIG. 3 example, the tester and device under test are unable to form a high quality link.

Figure 3:
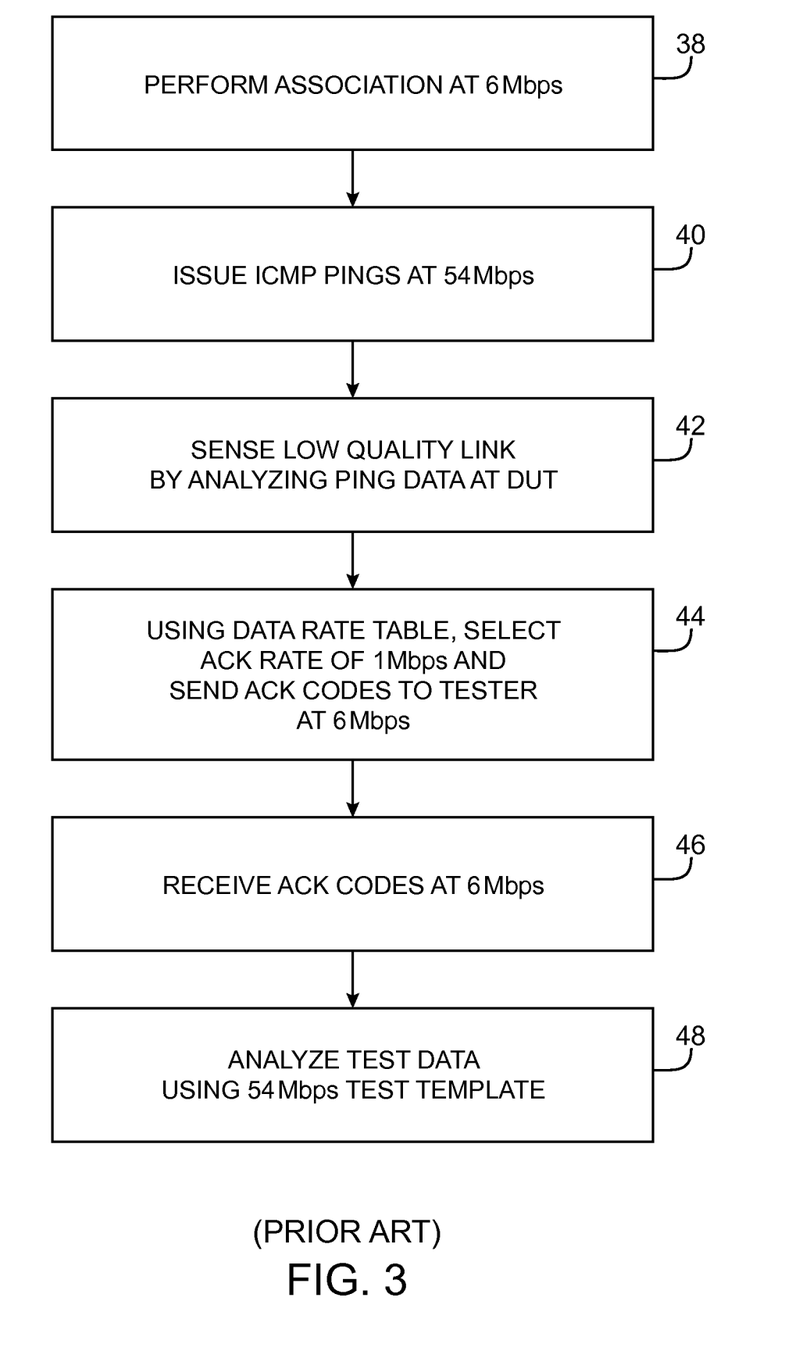
FIG. 3 is a flow chart of steps involved in conventional wireless device testing in a situation in which the wireless link between the tester and the device under test exhibits a low quality.

As with the conventional approach of FIG. 2, an association process may be used to allow the device under test to associate with the tester (step 38 of FIG. 3). During the association process of step 38, the wireless device under test and tester exchange control packets at the default data rate of 6 Mbps.

Once the device under test has associated with the tester, operation proceeds to step 40. During step 40, the tester issues Internet Control Message Protocol (ICMP) ping commands at a data rate of 54 Mbps.

The device under test receives and analyzes the ICMP pings at step 42 and evaluates the quality of the wireless link with the tester using a data rate table. In the example of FIG. 3, the link quality is low (i.e., the link quality is only able to support 6 Mbps transmissions during normal operation of device 14), so the device under test sends the ACK codes to the tester at a low data rate of 6 Mbps during step 44.

At step 46, the tester receives and captures the ACK codes that were transmitted at 6 Mbps.

The captured ACK code data can be analyzed at step 48. During step 48, the tester extracts radio-frequency parameters from the raw test data that has been captured. The tester can, for example, extract radio-frequency parametric measurement values such as transmit power and error vector magnitude.

With the conventional technique of FIG. 3, the tester uses the 54 Mbps test template in analyzing the test data in step 48. Because the ACK codes were actually transmitted at a different data rate (i.e., at 6 Mbps), the use of the 54 Mbps test template can lead to significant errors. For example, if the actual transmit power of the device under test is −15 dBm, the analysis operations of step 48 may, by applying the 54 Mbps test template to the captured 6 Mbps ACK data, produce an erroneous value of −17 dBm. As another example, if the actual EVM value was −25 dB, the use of the 54 Mbps profile when the tester is calculating the EVM value may result in computation of an incorrect EVM value of −9.1 dB (as an example).

These errors arise because the modulation schemes, frame sizes, and error coding schemes that are used for high quality links and low quality links may be different (as examples). For example, consider a scenario in which tester 12 and DUT 14 communicate using the 802.11a communications protocol. In terms of modulation schemes, a high quality link (e.g., a link having a link rate of 24, 36, 48, 54 Mbps) may be modulated using quadrature amplitude modulation (QAM), whereas a low quality link (e.g., a link having a link rate of 6, 9, 12, 18 Mbps) may be modulated using quadrature phase-shift keying (QPSK) or binary phase-shift keying (BPSK) schemes. For example, a high quality link with a 54 Mbps link rate may be modulated using 64-QAM, whereas a low quality link with a 6 Mbps link rate may be modulated using BPSK.

In terms of frame size, the high quality link may exhibit frame sizes of 224 μs, 252 μs, 336 μs, or sizes that are less than 1000 μs, whereas the low quality link may exhibit frame sizes of 1008 μs, 1344 μs, 2012 μs, or sizes that are greater than 1000 μs (as examples). In terms of error coding schemes, the high quality link may exhibit an error coding scheme that includes one bit of error code for every nine bits of transmitted data, whereas the low quality link may exhibit an error coding scheme that includes one bit of error code for every bit of transmitted data.

In general, a template that is appropriate for use by tester 12 to accurately extract transmit power, error vector magnitude, and other performance parameters from packets received from the DUT in connection with a high quality link will not be appropriate for use by tester 12 to accurately extract transmit power, error vector magnitude, and other performance parameters from packets received from the DUT in connection with a low quality link. This is because high and low quality links will not generally use the same modulation scheme, frame size, and error coding scheme. Because tester 12 will not generally know whether packets from the DUT are associated with a low or high quality link, it may be desirable to send data at a fixed rate (e.g., to send data using a desired modulation scheme and error coding scheme) regardless of link quality. This ensures that a single template can be used to decode data properly.

Figure 4:
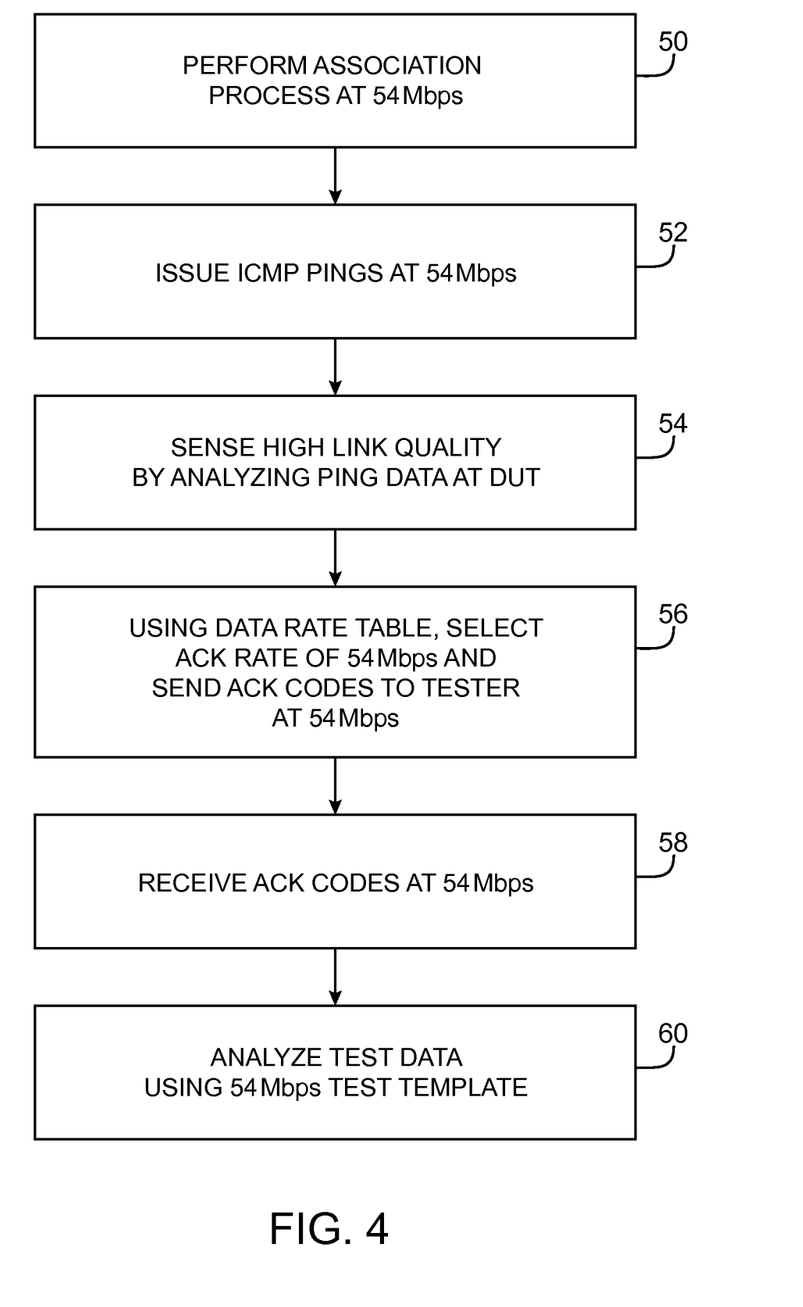
FIG. 4 is a flow chart of steps involved in wireless device testing in a situation in which the wireless link between a tester and a device under test exhibits a high quality in accordance with an embodiment of the present invention.
Figure 5:
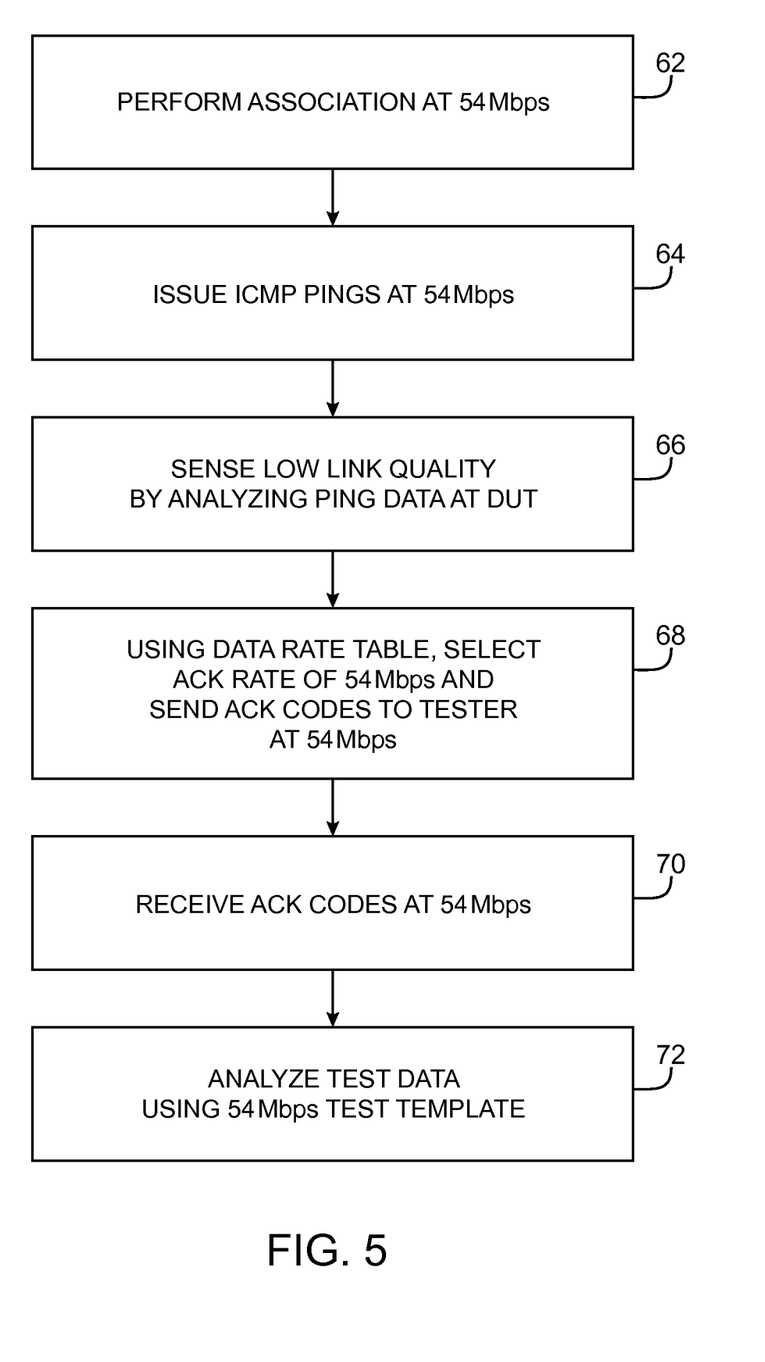
FIG. 5 is a flow chart of steps involved in wireless device testing in a situation in which the wireless link between a tester and a device under test exhibits a low quality in accordance with an embodiment of the present invention.

This type of test measurement inaccuracy may be addressed in system 10 using techniques of the type shown in FIGS. 4 and 5.

As shown in FIG. 4, an association process may be performed at step 50. During the association process of step 50, device under test 14 may associate with tester 12. The association process involves the transmission and reception of control packets (e.g., a request command to request an Internet Protocol address, a packet to return an IP address, packets associated with performing link adaptation functions, etc.). The association process may be performed by sending control packets "at speed"—i.e., at 54 Mbps. If no request (REQ) command is received from device under test 14, it can be assumed that 54 Mbps rate is too high and tester 14 can drop to a lower speed until a properly functioning rate is detected. For example, the data rate can first drop to 48 Mbps, followed by a drop to 36 Mbps, etc. In the examples of FIGS. 4 and 5, the REQ command information is successfully received, so data transmissions are conducted at 54 Mbps.

Once device under test 14 associates with tester 12, tester 12 may issue ICMP ping commands for device under test 14 (step 52). Unlike the conventional arrangements of FIGS. 2 and 3 in which ICMP ping commands were transmitted at a low default rate of 1 Mbps, the ICMP ping commands may be transmitted from tester 12 to device under test 14 at speed (e.g., at 54 Mbps).

At step 54, device under test 14 receives and analyzes the ICMP ping commands that were transmitted by tester 12 at step 52. The pings may be used in evaluating the quality of wireless link 16 between device 14 and tester 12. Unlike conventional systems, in which high link quality results in high ACK transmission rates and low link quality results in low ACK transmission rates, system 10 of FIG. 1 may use a data rate table that specifies that high ACK transmission rates are to be used regardless of measured link quality. The data rate is defined in beacon by tester 12 or other equipment, which is received by device 14 prior to testing or during testing. The data rate is loaded into the data rate table of device 14. In accordance with this type of transmission rate policy, device 14 may transmit ACK codes to tester 12 at a high data rate (e.g., 54 Mbps) during the operations of step 56.

At step 58, tester 12 may receive the transmitted ACK codes from device 14 at 54 Mbps.

Captured ACK code data can be analyzed at step 60. During the analysis operations of step 60, tester 12 may produce test results by processing raw test data. In particular, tester 12 may extract radio-frequency parameters from the raw data that has been captured. Tester 12 may, for example, extract radio-frequency parametric measurement values such as transmit power and error vector magnitude from the received ACK codes.

During the data analysis operations of step 60, the tester may use a test template that is tailored to the 54 Mbps data rate. Because the ACK signals were transmitted at 54 Mbps during the operations of step 56, the use of the 54 Mbps profile (test data analysis model) results in accurate computations of test results values. For example, if the actual transmit power of the device under test is −15 dBm, the analysis operations of step 60 will generally be able to produce an accurate extracted transmit power value of −15 dBm by applying the 54 Mbps test template to the captured ACK data.

The quality of the wireless link between tester 12 and device under test 14 may vary during testing. FIG. 5 is a flow chart illustrating illustrative steps that may be performed when system 10 is to perform testing in an environment in which link quality between device under test 14 and tester 12 is relatively poor (e.g., when the link quality is sufficiently low that the highest data rate that would be supported over link 16 during normal operation of device 14 would be 1 Mbps).

As shown in FIG. 5, the association process may be performed at step 62. During the association process of step 62, device under test 14 may associate with tester 12. As with the association process of step 50 (FIG. 4), the association process of step 62 of FIG. 5 involves the transmission and reception of control packets such as a request command to request an Internet Protocol address, a packet to return an IP address, packets associated with performing link adaptation functions, etc.

Once device under test 14 associates with tester 12, tester 12 may issue ICMP ping commands for device under test 14 at step 64. The ICMP ping commands may be transmitted from tester 12 to device under test 14 at speed (e.g., at 54 Mbps), unlike the conventional arrangements of FIGS. 2 and 3 in which ICMP ping commands were transmitted at a rate of 1 Mbps.

At step 66, device under test 14 receives and analyzes the ICMP ping commands that were transmitted by tester 12 at step 64 to determine the quality of link 16. In conventional systems a determination of low link quality results in use of a correspondingly low ACK transmission rate. However, as described in connection with the scenario of FIG. 4, system 10 of FIG. 1 may use a data rate table that specifies that high ACK transmission rates are to be used regardless of measured link quality (i.e., when a link has a low quality, ACK codes are transmitted at a rate greater than would be used during normal operation with a link of the same low quality). This type of transmission rate policy therefore dictates that device 14 should transmit ACK codes to tester 12 at a high data rate (e.g., 54 Mbps) during the operations of step 68, even though a low link quality was detected during the operations of step 66.

At step 70, tester 12 may receive the transmitted ACK codes from device 14 at 54 Mbps.

Captured ACK code data can be analyzed by tester 12 at step 72. During the analysis operations of step 72, tester 12 may extract radio-frequency parameters and other test results from the captured test data (ACK codes). For example, tester 12 may extract radio-frequency parametric measurement values such as transmit power and error vector magnitude from the received ACK codes.

As during the data analysis operations of step 60 in the high-link quality example of FIG. 4, tester 12 may use a test template that is tailored to the 54 Mbps data rate during the data analysis operations of step 72. Because device 14 was forced to transmit the ACK signals at the high data rate (54 Mbps) during the operations of step 68, the use of the 54 Mbps test template during the data analysis operations of step 72 results in accurate computations of test results values. For example, if the actual transmit power of the device under test is −15 dBm, the analysis operations of step 72 will generally be able to produce an accurate extracted transmit power value of −15 dBm. EVM values and other radio-frequency parameters may also be extracted accurately. These accurate results may be achieved despite the presence of a low link quality, because tester 12 performs analysis operations using a test template (i.e., a 54 Mbps template) that is calibrated to a data rate (54 Mbps) that matches the data rate of the transmitted and captured ACK data.

The steps shown in FIGS. 4 and 5 are merely illustrative. If desired, the association process (e.g., steps 50 and 62), the issuance of ICMP (e.g., steps 52 and 64), and the transmission of data between tester 12 and DUT 14 may be based on any desired 802.11 communications protocol with a selectable common link rate (e.g., the frames sizes of the transmitted data are fixed regardless of link quality), common frequency modulation scheme, common error coding scheme, etc. If desired, the selectable link rate may be equal to 6 Mbps, 9 Mbps, 12 Mbps, 18 Mbps, 24 Mbps, 36 Mbps, 48 Mbps, etc.

For example, consider a scenario in which tester 12 and DUT 14 communicate using the 802.11b communications protocol. Each of the steps in FIGS. 4 and 5 may be performed at a fixed (forced) data rate of 11 Mbps using a direct-sequence spread spectrum modulation scheme regardless of link quality. The template used to extract the transmit power and the error vector magnitude will be tailored to the 11 Mbps data rate. If desired, the fixed data rate may be changed to 1 Mbps, 2 Mbps, 5.5 Mbps, etc. The foregoing is merely illustrative of the principles of this invention and various modifications can be made by those skilled in the art without departing from the scope and spirit of the invention.

What is claimed is:

1. A method for performing wireless tests on a device under test using a wireless local area network tester that wirelessly communicates with the device under test over a wireless link, comprising:

when the wireless link has a first quality, capturing a first set of ACK codes in the wireless local area network tester that have been transmitted from the device under test at a given data rate;

when the wireless link has a second quality that is lower than the first quality, capturing a second set of ACK codes in the wireless local area network tester that have been transmitted from the device under test at the given data rate; and analyzing the captured first and second sets of ACK codes with a common test template in the wireless local area network tester, wherein the device under test uses a data rate table that directs the second set of ACK codes to be transmitted from the device under test to the wireless local area network tester at the given data rate even when the second quality is substantially lower than the first quality and wherein capturing the second set of ACK codes comprises:

capturing the second set of ACK codes in the wireless local area network tester that have been transmitted from the device under test at the given data rate as directed by the data rate table.

2. The method defined in claim 1, wherein the given data rate comprises 54 Mbps and wherein analyzing the captured first and second sets of ACK codes comprises analyzing the captured first and second sets of ACK codes with a 54 Mbps test template in the wireless local area network tester.

3. The method defined in claim 1, wherein during normal operation of the device under test in a wireless network having a wireless network link of the second quality, data is transmitted at a reduced data rate that is lower than the given data rate and wherein capturing the second set of ACK codes comprises capturing data that has been transmitted from the device under test at the given data rate that is greater than the reduced data rate.

4. The method defined in claim 1, wherein analyzing the captured first and second sets of ACK codes comprises extracting transmit power values for the device under test.

5. The method defined in claim 1, wherein analyzing the captured first and second sets of ACK codes comprises extracting error vector magnitude values.

6. The method defined in claim 1, further comprising:
with the wireless local area network tester, transmitting Internet Control Message Protocol pings to the device under test at the given data rate.

7. The method defined in claim 1, further comprising:
performing an association process between the wireless local area network tester and the device under test at the given data rate.

8. The method defined in claim 1, wherein the first and second sets of ACK codes are transmitted by the device under test using a common frequency modulation scheme and wherein capturing the first set of ACK codes and capturing the second set of ACK codes comprises:
capturing the first set of ACK codes transmitted using the common frequency modulation scheme; and
capturing the second set of ACK codes transmitted using the common frequency modulation scheme.

9. The method defined in claim 1, wherein the first and second sets of ACK codes are transmitted by the device under test using a common frame size and wherein capturing the first set of ACK codes and capturing the second set of ACK codes comprises:
capturing the first set of ACK codes transmitted using the common frame size; and
capturing the second set of ACK codes transmitted using the common frame size.

10. The method defined in claim 1, wherein the first and second sets of ACK codes are transmitted by the device under test using a common error coding scheme and wherein capturing the first set of ACK codes and capturing the second set of ACK codes comprises:
capturing the first set of ACK codes transmitted using the common error coding scheme; and
capturing the second set of ACK codes transmitted using the common error coding scheme.

* * * * *